US011811466B2

(12) United States Patent
Goichberg et al.

(10) Patent No.: US 11,811,466 B2
(45) Date of Patent: *Nov. 7, 2023

(54) CABLE MODEM TRANSCEIVER, CABLE MODEM, CABLE MODEM COMMUNICATION SYSTEM, PROCESSOR FOR A CABLE MODEM TRANSCEIVER, METHOD FOR CALIBRATING A CABLE MODEM TRANSCEIVER, AND COMPUTER PROGRAM

(71) Applicant: MAXLINEAR, INC., Carlsbad, CA (US)

(72) Inventors: Nathan Goichberg, Tel Aviv (IL); Shaul Shulman, Ramat Gan (IL)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,178

(22) Filed: Sep. 28, 2021

(65) Prior Publication Data

US 2022/0094392 A1 Mar. 24, 2022

Related U.S. Application Data

(63) Continuation of application No. 15/719,696, filed on Sep. 29, 2017, now Pat. No. 11,133,840.

(60) Provisional application No. 62/527,158, filed on Jun. 30, 2017.

(51) Int. Cl.
| | |
|---|---|
| *H04B 3/06* | (2006.01) |
| *H04B 3/46* | (2015.01) |
| *H04N 21/61* | (2011.01) |
| *H04B 1/38* | (2015.01) |
| *H04N 7/173* | (2011.01) |

(52) U.S. Cl.
CPC .............. *H04B 3/06* (2013.01); *H04B 1/38* (2013.01); *H04B 3/46* (2013.01); *H04N 21/6168* (2013.01); *H04N 7/17309* (2013.01)

(58) Field of Classification Search
CPC ... H04B 3/06; H04B 1/38; H04B 3/46; H04N 21/6168; H04N 7/17309
See application file for complete search history.

(56) References Cited

U.S. PATENT DOCUMENTS

| | | | |
|---|---|---|---|
| 6,791,995 B1 | 9/2004 | Azenkot et al. | |
| 6,963,603 B1 * | 11/2005 | Rezvani | H04L 5/008 375/232 |
| 11,133,840 B2 | 9/2021 | Goichberg et al. | |
| 2003/0058893 A1 * | 3/2003 | Dworkin | H04J 3/14 370/503 |

(Continued)

FOREIGN PATENT DOCUMENTS

WO    2018093788 A1    5/2018

*Primary Examiner* — Syed Haider
(74) *Attorney, Agent, or Firm* — Buchalter; Jason W. Croft

(57) ABSTRACT

A cable modem transceiver includes a processor configured to derive an instant of time for an upstream calibration signal on basis of upstream scheduling information. Further, the cable modem transceiver includes a transmitter configured to generate the upstream calibration signal at the derived instant of time. The cable modem transceiver additionally includes a detector configured to determine a property of the generated upstream calibration signal. The processor is further configured to derive at least one calibration parameter for the transmitter on basis of the detected property.

22 Claims, 8 Drawing Sheets

(56) References Cited

U.S. PATENT DOCUMENTS

| | | | |
|---|---|---|---|
| 2004/0105403 A1* | 6/2004 | Lin | H04B 7/18582 370/316 |
| 2004/0202202 A1* | 10/2004 | Kolze | H04J 3/0638 370/503 |
| 2005/0047379 A1 | 3/2005 | Boyden et al. | |
| 2011/0320634 A1 | 12/2011 | Yang | |
| 2013/0114480 A1* | 5/2013 | Chapman | H04N 21/42676 370/282 |

* cited by examiner

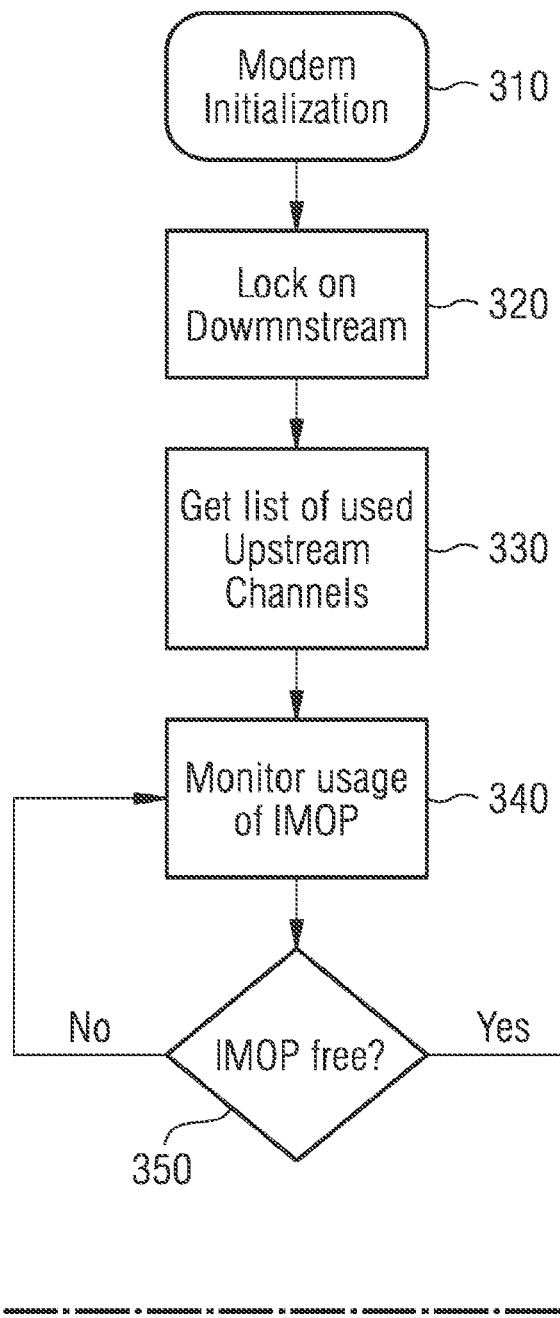

FIG. 3/B
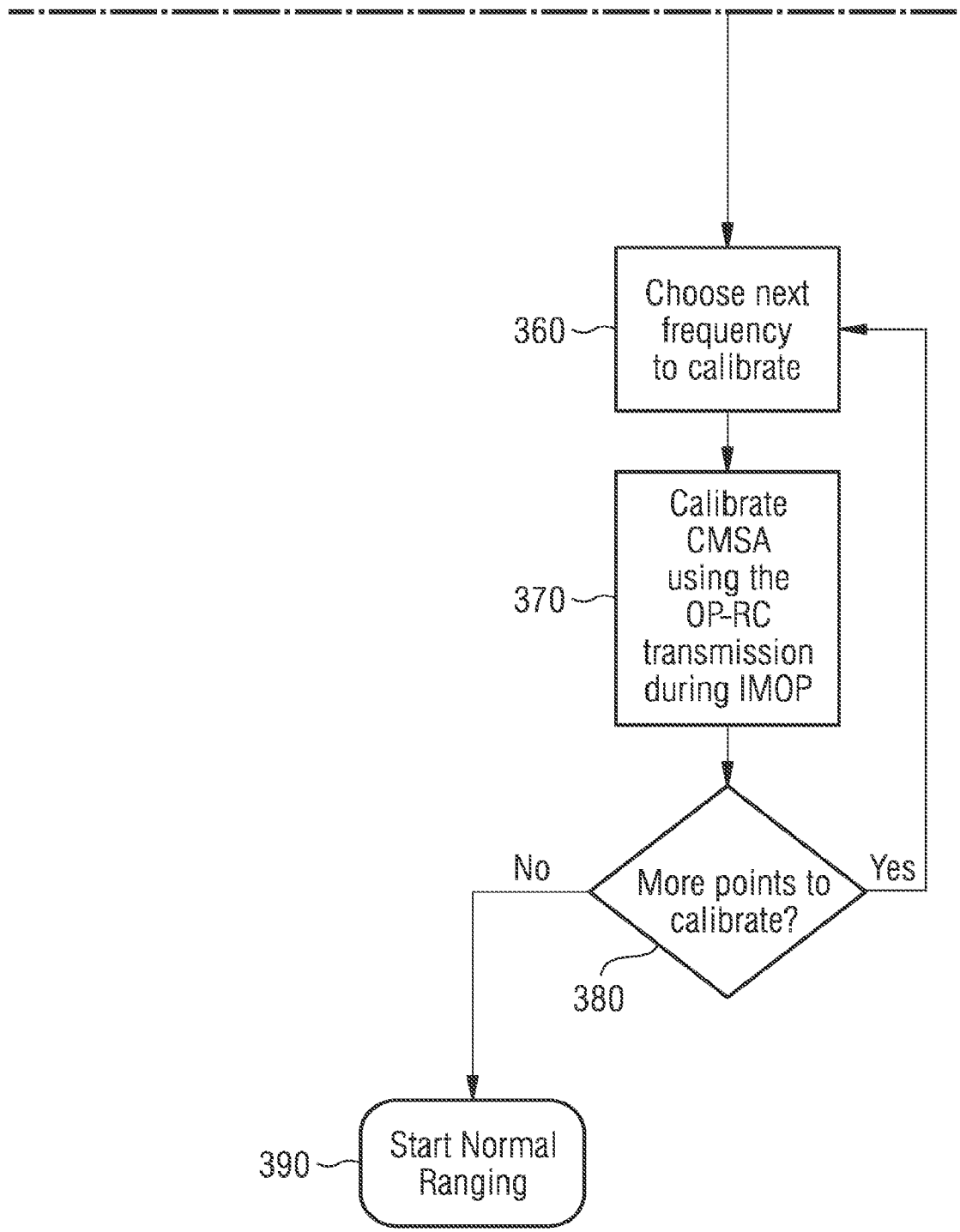

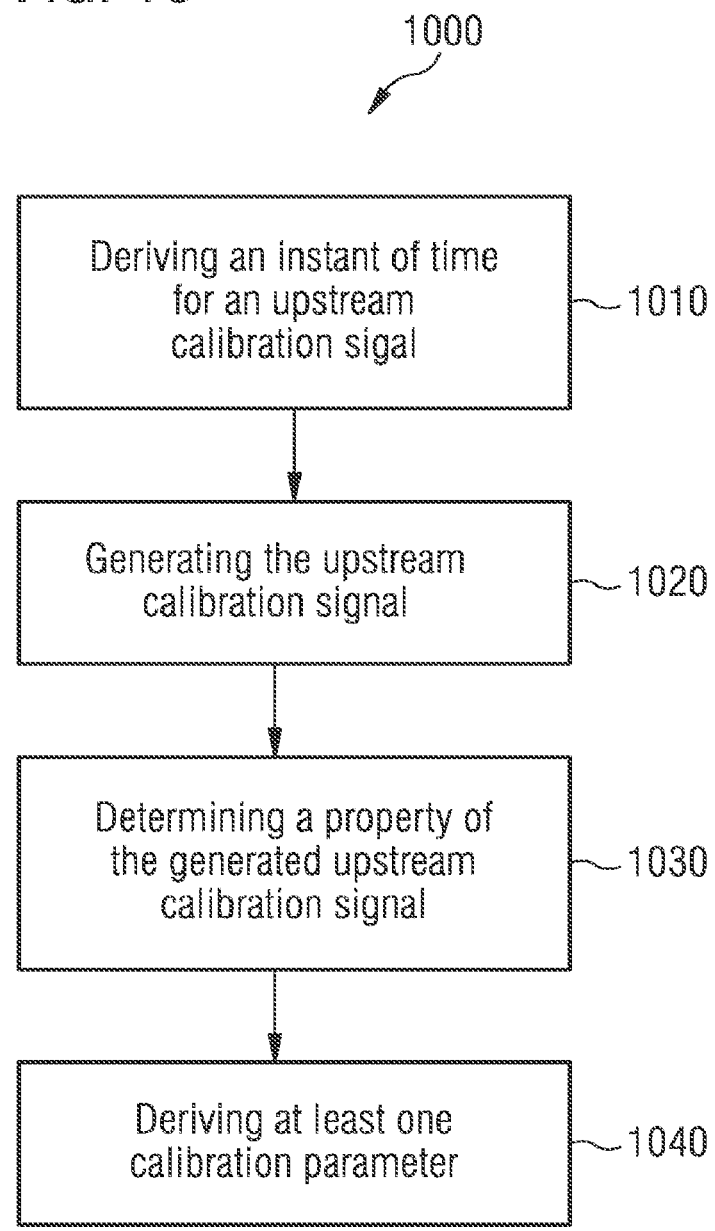

CABLE MODEM TRANSCEIVER, CABLE MODEM, CABLE MODEM COMMUNICATION SYSTEM, PROCESSOR FOR A CABLE MODEM TRANSCEIVER, METHOD FOR CALIBRATING A CABLE MODEM TRANSCEIVER, AND COMPUTER PROGRAM

FIELD

Examples relate to calibration concepts for a cable modem transceiver and in particular to cable modem transceivers, cable modems, cable modem communication systems, processors for cable modem transceivers, methods for calibrating a cable modem transceiver, and computer programs.

BACKGROUND

Cable modems may be optimized with respect to high transmit power accuracy. To achieve high transmit power accuracy typically cable modems and/or their transceivers are factory calibrated after or during their production.

There may be a desire for improved calibration concepts for cable modems and/or cable modem transceivers.

BRIEF DESCRIPTION OF THE FIGURES

Some examples of apparatuses and/or methods will be described in the following by way of example only, and with reference to the accompanying figures, in which FIG. 1 schematically illustrates a first example of a cable modem transceiver;

FIGS. 3A and 3B illustrate a flow chart of a second example of process steps for deriving at least one calibration parameter for a transmitter of a cable modem transceiver;

FIG. 10 illustrates a flowchart of an example of a method for calibrating a cable modem transceiver.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
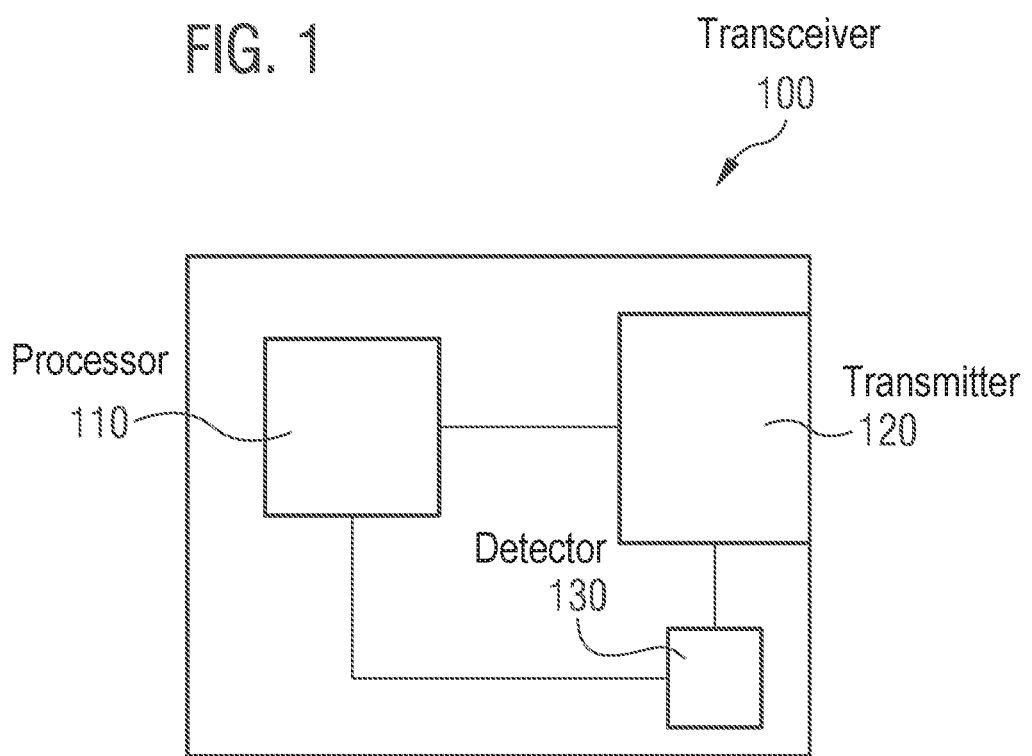

FIG. 1 schematically illustrates a first example of a cable modem transceiver 100. The cable modem transceiver 100 comprises a processor 110 configured to derive an instant of time for an upstream calibration signal on basis of upstream scheduling information. Additionally, the cable modem transceiver 100 comprises a transmitter 120 configured to generate the upstream calibration signal at the derived instant of time. The cable modem transceiver 100 further comprises a detector 130 configured to determine a property of the generated up-stream calibration signal. The processor 110 is further configured to derive at least one calibration parameter for the transmitter 120 on basis of the detected property.

The cable modem transceiver 100 may form or may be an element of a cable modem. When the cable modem transceiver 100 is connected to a cable modem communication system the processor 110 may be provided with the upstream scheduling information. For example, the cable modem transceiver 100 receives the upstream scheduling information from a cable modem termination system (CMTS) of the cable modem communication system and provides the received upstream scheduling information to the processor 110 or the upstream scheduling information is stored in a memory device of the cable modem transceiver 100 and the processer 110 is configured to read the upstream scheduling information from the memory device.

The instant of time derived by the processor 110 may be an instant of time at which the cable modem transceiver 100 may transmit the generated upstream calibration signal without disturbing transmissions of other cable modem transceivers of the cable modem communication system.

Further, the transmitter 120 may comprise a digital-to-analog converter (DAC) and/or an amplifier for generating the upstream calibration signal. The generated upstream signal may be a signal having a predetermined frequency and a predetermined temporal length. For example, the generated upstream calibration signal is a sine wave signal having a single predetermined frequency, a square wave signal or a modulated signal. The temporal length of the generated upstream calibration signal may be a multiple, in particular an integer multiple, or a fraction of a tick, e.g. of 6.25 [ts, or of a mini-slot. For example, the temporal length of the generated upstream calibration signal is 1 μs, 2 [ts, 5 [ts, 10 [ts or 12.5 us.

The detector 130 may form or comprise an upstream band receiver, for example. The property of the generated upstream calibration signal determined by the detector 130 may be a magnitude, a power and/or a frequency of the generated upstream calibration signal. Additionally, the at least one calibration parameter derived by the processor 110 may comprise a gain parameter and/or a gain and frequency parameter set for the transmitter 120. For example, the at least one calibration parameter comprises a gain value for the digital-to-analog converter or the amplifier of the transmitter 120.

In this way, the at least one calibration parameter for the transmitter 120 may be derived upon connecting the cable modem transceiver 100 to the cable modem communication system for the first time, upon powering on the cable modem transceiver 100 while being connected to the cable modem communication system, and/or during normal operation of the cable modem transceiver 100. By this, the transmitter 120 may be efficiently calibrated in field. Additionally, deriving the at least one calibration parameter for the transmitter 120 may be omitted during a factory calibration of the cable modem transceiver 100. In this way, a production time of the cable modem transceiver 100 may be reduced. By this, production costs for manufacturing the cable modem transceiver 100 may be reduced.

The cable modem transceiver 100 may be a transceiver configured to operate according to every known and future telecommunication standard, such as for example: one of the cable modem communication systems standardized by Cable Television Laboratories, Inc. (CableLabs), e.g. Data Over Cable Service Interface Specification (DOCSIS), in particular DOCSIS 1.0, DOCSIS 1.1, DOCSIS 2.0, DOCSIS 3.0, DOCSIS 3.1, or Full Duplex DOCSIS 3.1, or cable modem communication systems with different standards, e.g. International Telecommunication Union Telecommunication Standardization Sector (ITU-T) Recommendation J.112, ITU-T Recommendation J.122, ITU-T Recommendation J.222, Euro-DOCSIS, Digital Video Broadcasting (DVB) EuroModem, or PacketCable. The terms cable modem communication system, cable modem communication network, cable modem net-work and cable network may be used synonymously. In a cable modem communication system a plurality of cable modems or cable modem transceivers may be connected to a single cable modem termination system located at a headend of a cable modem communication network provider or operator and may further be configured to communicate with the single cable modem termination system. Signals transmitted from the cable modem termination system to one or more cable modems or cable modem transceivers may be denoted downstream signals while signals transmitted from a cable modem or a cable modem transceiver to the cable modem termination system may be denoted upstream signals.

The processor 110 may be a general-purpose processor or a single-purpose processor. For example, the processor 100 is a microprocessor, a microcontroller, a digital signal processor, or a central processing unit. The processor 110, the transmitter 120 and the detector 130 may form individual elements of the cable modem transceiver 100 or the processor 110, the transmitter 120 and the detector 130 may form an integrated circuit (IC) or a system on chip (SoC).

According to some examples, the upstream scheduling information optionally indicates a starting point of a non-busy time slot of an upstream path of a cable modem communication system. In this way, interference with other upstream transmissions, e.g. of other cable modems or cable modem transceivers of the cable modem communication system, due to emitting the generated upstream calibration signal by the cable modem transceiver 100 may be avoided. The upstream path may be an upstream path of the cable modem transceiver 100 or an upstream path of another cable modem transceiver or cable modem connected to the cable modem communication system. For example, the non-busy time slot of the upstream path is a time slot, in which no upstream transmissions are scheduled or granted by the cable modem termination system of the cable modem communication system, or the non-busy time slot is a time slot reserved for upstream transmissions of the cable modem transceiver 100, e.g. the time slot may be scheduled or granted by the cable modem termination system for upstream transmissions of the cable modem transceiver 100.

According to some examples, the derived instant of time optionally lies within the non-busy time slot of the upstream path of the cable modem communication system. In this way, an interference with upstream transmissions of other cable modem transceivers or cable modems due to emitting the upstream calibration signal may be avoided or at least reduced.

According to some examples, the non-busy time slot optionally is selected from the group of an initial maintenance opportunity, a broadcast initial maintenance opportunity, a ranging opportunity, and a transmission opportunity. The initial maintenance opportunity, the broadcast initial maintenance opportunity, the ranging opportunity, and/or the transmission opportunity may be an opportunity defined by a DOCSIS standard, in particular by the DOCSIS 3.0 standard or the DOCSIS 3.1 standard, or an opportunity defined by any other cable modem communication system standard.

According to some examples, the derived at least one calibration parameter for the transmitter 120 optionally comprises a gain parameter for the transmitter 120. In this way, an output power of the transmitter 120 may be efficiently calibrated. By this, an upstream power accuracy of the cable modem transceiver 120 may be improved. For example, the transmitter 120 may adjust a magnitude or power of the upstream calibration signal on basis of the gain parameter. The gain parameter may be a parameter for a digital-to-analog converter or an amplifier of the transmitter 120, for example.

According to some examples, the cable modem transceiver 100 optionally further comprises an amplifier within the transmitter 120. The derived at least one calibration parameter may comprise a gain value of the amplifier for amplifying upstream signals having a frequency of the generated upstream calibration signal. In this way, the amplifier may be efficiently calibrated for the frequency of the generated upstream calibration signal. The gain value may be an analog gain value and/or may indicate a control voltage for the amplifier. For example, the amplifier may be a variable-gain amplifier and/or a voltage-controlled amplifier (VCA).

According to some examples, the derived at least one calibration parameter optionally comprises a digital gain value for a digital transmission path of the transmitter 120. In this way, the digital transmission path may be efficiently calibrated. For example, the digital trans-mission path may comprise a digital-to-analog converter and/or a digitally controlled amplifier (DCA). The digital-to-analog converter and/or the digitally controlled amplifier may adjust a magnitude or power of the upstream calibration signal on basis of the digital gain value, for example. For example, the digital transmission path may be a transmission path of the transmitter 120, in which signals are processed digitally only. For example, an input of an analog transmission path of the transmitter 120 may be connected with an output of the digital transmission path of the transmitter 120 or vice versa. The analog transmission path of the transmitter 120 may comprise an amplifier, in particular an analog amplifier, for ex-ample. For example, the analog transmission path may be a transmission path of the transmitter 120, in which signals are processed analogous only.

According to some examples, the cable modem transceiver 100 optionally further comprises a receiver configured to receive the upstream scheduling information from a cable modem termination system of a cable modem communication system. In this way, the upstream scheduling information may be efficiently provided to the processor 110. The receiver may further be configured to receive downstream signals from the cable modem termination system, for example. For example, the upstream scheduling information may be comprised in an upstream bandwidth allocation map (MAP) message transmitted from the cable modem termination system to the cable modem transceiver 100.

According to some examples, the receiver optionally is further configured to detect signals of other cable modem transceivers within a particular time slot. The upstream calibration signal is generated only, when signals received from other cable modem transceivers are detected by the receiver within a series of subsequent particular time slots with a magnitude below a threshold or when no signals from other cable modem transceivers are detected by the receiver within the series of subsequent particular time slots. In this way, an interference with upstream transmissions of other cable modem transceivers or cable modems due to emitting the upstream calibration signal by the cable modem transceiver 100 may be reduced or avoided.

For example, the particular time slot may be an initial maintenance opportunity, a broadcast initial maintenance opportunity, and/or a ranging opportunity. The series of subsequent particular time slots may be a series of directly subsequent particular time slots. Alternatively or additionally, one or more intervening particular time slots may lie between two subsequent particular time slots of the series of subsequent particular time slots, wherein in the one or more intervening particular time slots signals received from other cable modem transceivers are detected by the receiver with a magnitude above the threshold. The threshold may be a predetermined threshold. For example, the threshold is 30 dBmV, 20 dBmV, 15 dBm V, 10 dBm V, 5 dBm V, 1 dBm V, 0dBm V, −5 dBm V or −10 dBm V.

According to some examples, the receiver optionally is further configured to detect signals of other cable modem transceivers within a particular time slot. The upstream calibration signal is generated only, when signals received from other cable modem transceivers are detected by the receiver within the particular time slot with a magnitude below a threshold or when no signals from other cable modem transceivers are detected by the receiver within the particular time slot.

In this way, an interference with upstream transmissions of other cable modem transceivers or cable modems due to emitting the upstream calibration signal may be reduced or avoided. According to some examples, the upstream scheduling information optionally indicates a starting point of the particular time slot and/or starting points of the particular time slots of the series of subsequent particular time slots.

According to some examples, the detector optionally is connected to an upstream monitoring path of the cable modem transceiver 100. The upstream monitoring path may be coupled to a transmission path of the cable modem transceiver 100 after an amplifier or after a digital-to analog converter of the transmitter 120. For example, the transmission path is connected with an output of the amplifier or the digital-to analog converter. The upstream monitoring path may be coupled to the transmission path by a coupler, a directional coupler, a hybrid coupler, or a power divider.

According to some examples, the determined property of the generated upstream calibration signal optionally is a magnitude or a power of the generated upstream calibration signal. In this way, an output power of the transmitter 120 may be calibrated.

According to some examples, the detector 130 optionally is selected from the group of a spectrum analyzer and a power meter.

According to some examples, the processor 110 optionally is further configured to determine a gain parameter for generating the upstream calibration signal by the transmitter 120 and a frequency of the upstream calibration signal on basis of predetermined output power calibration information. The predetermined output power calibration information may comprise a measured value of a power a reference signal previously generated by the transmitter 120 using a gain parameter or a gain parameter set. For example, the value of the power may be measured during or directly after a production of the cable modem transceiver 100 using accurate measurement equipment. The predetermined output power calibration information may comprise output power reference calibration data. For example, the determined gain parameter for generating the upstream calibration signal may be the gain parameter used for generating the reference signal and/or the determined frequency of the upstream calibration signal may be a frequency of the reference signal. Alternatively or additionally, the gain parameter for generating the upstream calibration signal may be determined such that the power of the generated upstream calibration signal is less than or equal to a power of a ranging request, e.g. 17 dBmV.

According to some examples, the processor 110 optionally is configured to derive the at least one calibration parameter for the transmitter 120 on basis of the determined property, the determined gain parameter for generating the upstream calibration signal, and the predetermined output power calibration information.

According to some examples, the predetermined output power calibration information optionally comprises a predetermined property of a further upstream calibration signal generated by the transmitter. The derived at least one calibration parameter may indicate a difference between the predetermined property and the determined property for the determined gain parameter. For example, the predetermined property comprises a measured power of a reference signal previously, e.g. during a factory calibration, generated by the transmitter 120 using a reference gain value for the transmitter 120. The transmitter 120 may generate the upstream calibration signal using the reference gain value. Further, the upstream calibration signal may have a frequency of the reference signal. The determined property may further comprise a power of the generated upstream calibration signal. Additionally, the derived at least one calibration parameter may indicate a difference between the measured power of the reference signal and the determined power of the generated upstream calibration signal. Using the difference an output power of the transmitter 120 or of the cable modem transceiver 100 may be adjusted to a desired value, e.g. by increasing and/or reducing the gain value and/or the digital gain value for the transmitter 120. For example, the desired value for the output power may be commanded to the cable modem transceiver 100 by the cable modem termination system.

According to some examples, the predetermined output power calibration information optionally comprises a predetermined property of a further upstream calibration signal generated by the transmitter. The at least one calibration parameter may be extrapolated on basis of the predetermined property and the determined property. For example, the predetermined property comprises a measured power of a reference signal previously, e.g. during a factory calibration, generated by the transmitter 120 using a reference gain value for the transmitter 120. The upstream calibration signal may be generated using a gain value for the transmitter 120 different from the reference gain value and/or the upstream calibration signal may have a frequency different from the frequency of the reference signal. Further, the determined property may comprise a power of the generated upstream calibration signal. The at least one calibration parameter may be extrapolated, e.g. linear extrapolated, from the measured power of the reference signal, the determined power of the generated upstream calibration signal, the frequency of the reference signal and the frequency of the upstream calibration signal. Using the extrapolated at least one calibration parameter an output power of the transmitter 120 or of the cable modem transceiver 100 may be adjusted to the desired value, e.g. by increasing and/or reducing the gain value and/or the digital gain value for the transmitter 120.

According to some examples, the processor 110 optionally is further configured to store the at least one calibration parameter in a calibration adjustment table. The calibration adjustment table may be stored in a memory device of the cable modem transceiver 100.

According to some examples, the processor 110 optionally is further configured to control an output power of the transmitter 120 on basis of the at least one calibration parameter. For example, the processor 110 may control an output power of the amplifier of the transmitter 120 by setting the gain value of the amplifier and/or by setting the digital gain value for the digital transmission path.

According to some examples, the transmitter 120 optionally is configured to generate a plurality of upstream calibration signals at the derived instant of time. Additionally, the detector 130 may be configured to determine a property of each of the upstream calibration signals of the generated plurality of upstream calibration signals. Further, the processor 110 may be configured to derive the at least one calibration parameter or a plurality of calibration parameters for the transmitter 120 on basis of the determined properties. For example, determining the plurality of calibration parameters by the processor 110 may be performed similar to determining the at least one calibration parameter as discussed above and/or be-low.

According to some examples, the upstream calibration signals of the generated plurality of upstream calibration signals optionally have different frequencies. In this way, the transmitter 120 may be calibrated for a frequency band.

According to some examples, the upstream calibration signals of the generated plurality of upstream calibration signals optionally are generated with different gain parameters for the transmitter 120.

According to some examples, the derived instant of time optionally lies prior to a registration of the cable modem transceiver 100 at a cable modem termination system of a cable modem communication system.

According to some examples, a transmit power accuracy of the cable modem transceiver 100 or of a DOCSIS cable modem as well as a monitoring accuracy of the upstream band, e.g. upstream spectrum analysis, of the cable modem transceiver 100 may be improved.

According to some examples, a factory calibration procedure of the detector 130 or of an upstream band receiver may be omitted and replaced by a field calibration when the cable modem transceiver 100 is on-line. This may enable significant cable modem transceiver 100 cost saving by shortening mass production time. Moreover, a transmit power accuracy of the cable modem transceiver 100 may be improved by up to 2 dB and up to 50 mW of power consumption may be saved. Additionally, a reliance on the accuracy of characterization tables provided by power amplifier vendors may be significantly reduced.

According to some examples, already available transmit power reference calibration data may be used in the cable modem transceiver 100 to perform an on-line self-calibration algorithm of the detector 130 or of an upstream spectrum analysis function of the cable modem transceiver 100 when the cable modem transceiver 100 is deployed in the field. In this way, performing another factory calibration for the detector 130 or for the upstream spectrum analysis may be omitted. According to some examples, the cable modem transceiver 100 or the processor 110 may find special quiet time to transmit short, non-disruptive dummy traffic with specific TX-PHY settings, and then measures its own transmissions and convert the measurements into corrections of transmit power gain commands, e.g. transmit power gain commands for the transmitter 120.

According to some examples, the cable modem transceiver 100 or the processor 110 may use already available upstream output power calibration data to perform an on-line self-calibration of the detector 130 or a spectrum analysis, which in turn may enable performing a more comprehensive output power calibration, all in the field with the cable modem transceiver 100 on-line. Therefore, a dedicated factory calibration station and/or an increase of a latency of the calibration process may be omitted.

According to some examples, the predetermined output calibration data may comprise data from an accurate output power reference calibration (OP-RC) and may enable a calculation of the at least one calibration parameter for the transmitter 120 or a gain setting for the tar-get transmission based on OP-RC data. The OP-RC may be a factory calibration that uses a dedicated calibration setup and measures the transmissions of the cable modem transceiver 100 using accurate testing equipment. The OP-RC may be measured using one of many possible analog gain settings and the calibration data may be extrapolated to other analog gain settings.

According to some example, an upstream, e.g. cable modem, spectrum analysis (CMSA) feature may be implemented in the cable modem transceiver 100, e.g. in form of the detector 130. According to some examples, the relative CMSA measurements or properties determined by the detector 130 may be accurate, e.g. when an input power drops by X dB, the measurement may drop by X dB, even when the absolute measurement results are not calibrated.

According to some examples, in order to perform a self-calibration (SC), a number of transmissions and measurements may be made, e.g. by the cable modem transceiver 100. Since the self-calibration process may run in the field, disrupting the existing network functionality and generating out-of-spec transmissions and/or emissions may be avoided.

According to some examples, one of the ways a self-calibration of the CMSA (CMSA-SC) may be accomplished may be by transmitting and measuring signals during initial ranging transmit opportunities, e.g. using dummy transmissions.

According to some examples, an output power self-calibration (OP-SC) may be done by measuring the actual transmissions that the cable modem transceiver 100 is doing, and filling a calibration adjustment table, and/or optionally also by using transmissions during initial ranging opportunities.

Figure 2:
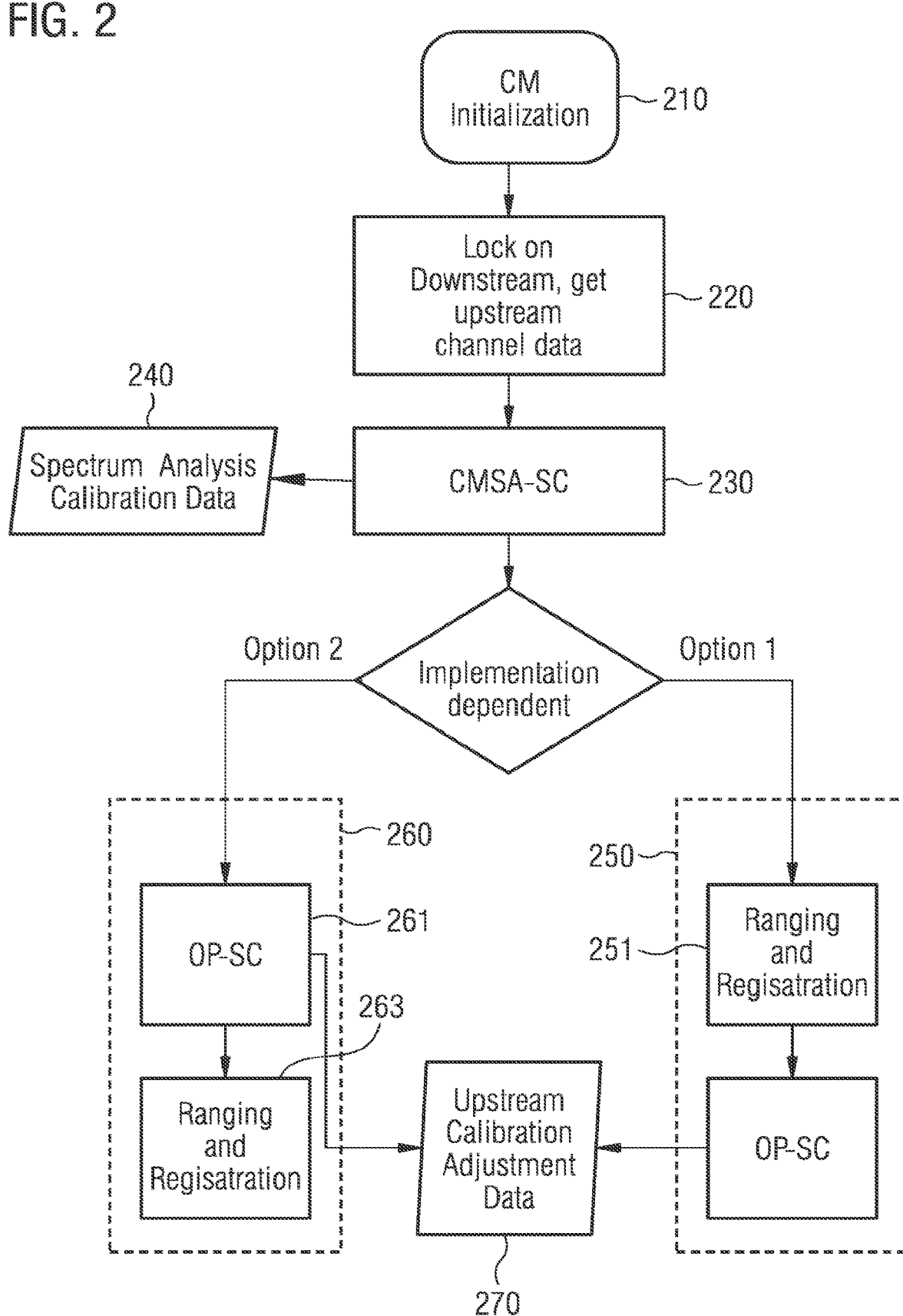
FIG. 2 illustrates a flow chart of a first example of process steps for deriving at least one calibration parameter for a transmitter of a cable modem transceiver.

The process steps illustrated in FIGS. 2 to 5 may be performed using the cable modem transceiver 100 or using a cable modem comprising the cable modem transceiver 100 to derive at least one calibration parameter for the transmitter 120 of the cable modem transceiver 100, for example. FIG. 2 illustrates a flow chart of a first example of process steps 210-270 for deriving at least one calibration parameter for a transmitter 120 of a cable modem transceiver 100. The cable modem transceiver 100 may be connected to a cable modem communication system. Further, the cable modem communication system may comprise a cable modem termination system.

In process step 210 the cable modem transceiver 100 is initialized or powered on. After initialization of the cable modem transceiver 100, the receiver of the cable modem transceiver 100 locks on a downstream of the cable modem termination system and receives or gets the upstream scheduling information in process step 220. The upstream scheduling information may form or may be upstream channel data. In process step 230 a self-calibration of the CMSA (CMSA-SC) is performed to derive the at least one calibration parameter for the transmitter 120. The derived at least one calibration parameter is added to spectrum analysis calibration data in process step 240. According to a first option 250, after process step 240 a ranging and a registration of the cable modem transceiver 100 at the cable modem termination system is performed in process step 251. Afterwards, an output power self-calibration (OP-SC) is performed in process step 253, e.g. to derive at least one further calibration parameter for the transmitter 120. According to a second option 260, after process step 240 an output power self-calibration (OP-SC) is performed in process step 261, e.g. to derive at least one further calibration parameter for the transmitter 120. Afterwards, a ranging and a registration of the cable modem transceiver 100 at the cable modem termination system is performed in process step 263. The at least one further calibration parameter for the transmitter 120 determined in process step 253 or 261 is added to spectrum analysis calibration data in process step 270. Whether the first option 240 or the second option 250 is used may be implementation dependent.

FIG. 2 shows an example of self-calibration. A method to accomplish the transmissions and measurements used for CMSA-SC, e.g. in process step 230, may be as follows: The measurements may be performed prior to actual ranging and registration, the transmit may be performed during the not-busy periods or non-busy periods of the Broadcast Initial Maintenance Opportunity (IMOP), and dummy bursts at low transmission power may be used that the cable modem termination system (CMTS) will not understand and will therefore discard.

According to some examples, the process steps 210-270 may describe steps to self-calibrate a cable modem transceiver 100 or a cable modem that is already deployed, e.g. in the field, and on-line, e.g. connected to the plant or a cable operators network. These steps may also be done as a factory self-calibration with the cable modem transceiver 100 or the cable modem off-network. In this case, some of the suggestions or methods described above or below may be omitted because there are no constraints on the transmission power level, timing and duration. Executing the process as a factory self-calibration may significantly simplify the implementation.

More details and aspects are mentioned in connection with the embodiments described above or below. The embodiment shown in FIG. 2 may comprise one or more optional additional features corresponding to one or more aspects mentioned in connection with the pro-posed concept or one or more embodiments described above (e.g. FIG. 1) or below (e.g. FIG. 3A-10).

FIGS. 3A and 3B illustrate a flow chart of a second example of process steps 310-390 for deriving at least one calibration parameter for a transmitter 120 of a cable modem transceiver 100. The cable modem transceiver 100 may be connected to a cable modem communication system. Further, the cable modem communication system may comprise a cable modem termination system.

In process step 310 the cable modem transceiver 100 is initialized or powered on. After initialization of the cable modem transceiver 100, the receiver of the cable modem transceiver 100 locks on a downstream of the cable modem termination system in process step 320. In process step 330 the receiver or the processor 110 receives or gets the upstream scheduling information. The upstream scheduling information may form or may be upstream channel data. In process step 340, the receiver monitors usage of the IMOP. The processor 110 and/or the receiver determines in process step 350 if the IMOP is free. If the IMOP is used, process step 340 is repeated. If the IMOP is free, a next frequency to calibrate is chosen in process step 360. Afterwards, the CMSA is calibrated using OP-RC transmissions during IMOP in process step 370. In process step 380 the processor 110 checks, if further points, e.g. further frequency and/or gain settings, may be calibrated. In case further points are calibrated, process step 360 is repeated. Otherwise, a normal ranging, e.g. of the cable modem transceiver 100, is started in process step 390.

FIGS. 3A and 3B show an example of CMSA-SC and describes an example of a field measurement method. In order to join the cable modem communication system or a network and register with the cable modem termination system the cable modem transceiver 100 may perform several stages, which include initial ranging. The cable modem termination system may allocate time periods or opportunities that the cable modem transceiver 100 may use in order to send initial requests to the cable modem termination system before being ranged. This is called Broadcast Initial Maintenance Opportunity (IMOP). The cable modem transceiver 100 may try to transmit initial ranging bursts using the IMOP and wait for a response from the cable modem termination system in order to continue ranging. In case of a collision while using the IMOP, the cable modem transceiver 100 may back-off for an arbitrary period of time and then try transmitting again. Normally, after all cable modem transceivers have joined the network, the IMOP is not used. Nevertheless it may still be allocated periodically by the cable modem termination system. The CMSA-SC may use this opportunity because a transmission during this time will not disrupt the network, and after some time of inactivity on the IMOP there is minimal risk of interfering with another cable modem transceiver's ranging request. After turning on and initialization the cable modem transceiver 100 may receive data from the downstream channel which defines the used upstream channels. The cable modem transceiver 100 may then monitor the IMOP time allocations for activity. When the cable modem transceiver 100 determines that the IMOP is not used it may start transmitting dummy bursts that will not be understood by the cable modem termination system and optionally do not include information about the transmitting cable modem transceiver 100. The cable modem termination system will either not receive the transmission due to low transmit power or receive but discard these transmissions. The cable modem transceiver 100 may self-calibrate the CMSA by measuring the transmission. The transmissions may be either the same transmissions that were used in OP-RC, or they can rather be digitally adjusted to 17 dBmV which is the initial transmit power for ranging. Since there are accurate measurements of these transmissions, the delta between the known measurement and the spectrum analysis measurement may be calculated and recorded in a CMSA calibration table. Once all targeted calibration points, e.g. frequencies and attenuation levels, have been measured the cable modem transceiver 100 may proceed to the normal process of ranging and registration.

According to some examples, the process described above of field CMSA-SC using IMOP transmissions optionally is performed one single time only, which is the first time that the cable modem transceiver 100 is connected to a network. This may happen at customer premises at time of deployment or while testing at the manufacturer or operator premises. Executing the self-calibration process may be omitted on subsequent cable modem transceiver 100 turn-on and ranging. Periodic re-calibrations may be considered.

According to some examples, while transmitting dummy bursts using OP-RC power levels, e.g. −30 dBmV, may be performed without violating any specific DOCSIS 3.1 requirements, e.g. the specification may suggest to start the actual ranging with 17 dBmV transmissions. As the OP-RC has an accurate measurement of the signal, the transmission level may be adjusted to 17 dBmV or even lower using digital gain only. Since digital gain may be accurate, the adjustment will not impact the accuracy of the measurement.

According to some examples, the measurements taken during IMOPs may be averaged in order to avoid an effect on the measurement by an unexpected transmission from another cable modem transceiver during the IMOP.

According to some examples, depending on the implementation, the CMSA may be used to measure a narrow frequency band. Measuring the narrow frequency band may take less time and may therefore be easier to fit within the IMOP time frame. A narrow frequency band may be sufficient for deriving the calibration data.

According to some examples, since the cable modem transceiver 100 may be locked on the downstream channel in some implementations, care may be taken so that the transmissions do not disrupt the downstream reception, because even though losing lock at this stage may increase the calibration process duration. Appropriate attenuation level may be used for the first measurement and for lower attenuation levels the power increase may be compensated by digital, e.g. accurate, gain.

According to some examples, optionally only the frequencies that are currently in use by the upstream channels are measured. The frequencies in use may be the actual frequencies of interest that are used for transmission. Typically, the used channel configuration does not change often. According to some examples, if the response of the system is already characterized, the measurements at specific points may be used to align the relevant characterization graph to the correct levels. Then, if needed, the aligned characterization graph may be used to interpolate the calibration data for a specific point.

According to some examples, alternatively or additionally to transmitting bursts during IMOP, the following method of CMSA calibration signal transmission may be considered: self-calibrate by measuring the actual, e.g. real ranging bursts of the cable modem transceiver 100, while achieving the delta from OP-RC using digital gain only and keeping the analog gain at the setting used for OP-RC. This is possible because the initial transmissions may be lower than the OP-RC data achieved using the currently used settings. Here, a control of the transmitted levels may be limited and therefore optionally not all CMSA attenuation levels are calibrated, and opportunities for averaging may be missing.

According to some examples, alternatively or additionally to transmitting bursts during IMOP, the following method of CMSA calibration signal transmission may be considered: after ranging and registration, dummy traffic to the cable modem transceivers 100 own IP address, hardware address or MAC address may be generated and the cable modem transceivers 100 own bursts may be measured. Since the transmissions may be performed according to the commanded power by the cable modem termination system and the transmission may be made with the analog gain that was used during the OP-RC, the output power level may be adjusted using digital gain only. It may be favorable that there is enough digital gain headroom to amplify the signal without clipping. In case there may not be enough headroom to amplify using the digital gain, using this method may mandate implementing OP-RC at higher analog gain levels.

According to some examples, the described process based on output power reference calibration data may instead or additionally be based on spectrum analysis reference calibration data. In other words, a factory calibration may calibrate the detector 130 or a spectrum analysis instead of the output power. In such case, self-calibrated reference output power data or even full OP calibration data may be derived using the spectrum analysis, for example by transmitting bursts with low power levels in the IMOP periods using a selected analog gain setting and adjusting digital gain to achieve the exact signal level that was used to calibrate the CMSA or at some offset from it. Then the self-calibration may continue as described above or below. In this approach the cable modem transceiver 100 may transmit with specified accuracy, and if output power is not initially calibrated then at least some of the trans-missions will not be spec-compliant until the system finds suitable corrections.

More details and aspects are mentioned in connection with the embodiments described above or below. The embodiment shown in FIGS. 3A and 3B may comprise one or more optional additional features corresponding to one or more aspects mentioned in connection with the pro-posed concept or one or more embodiments described above (e.g. FIG. 1-2) or below (e.g. FIG. 4-10).

Figure 4:
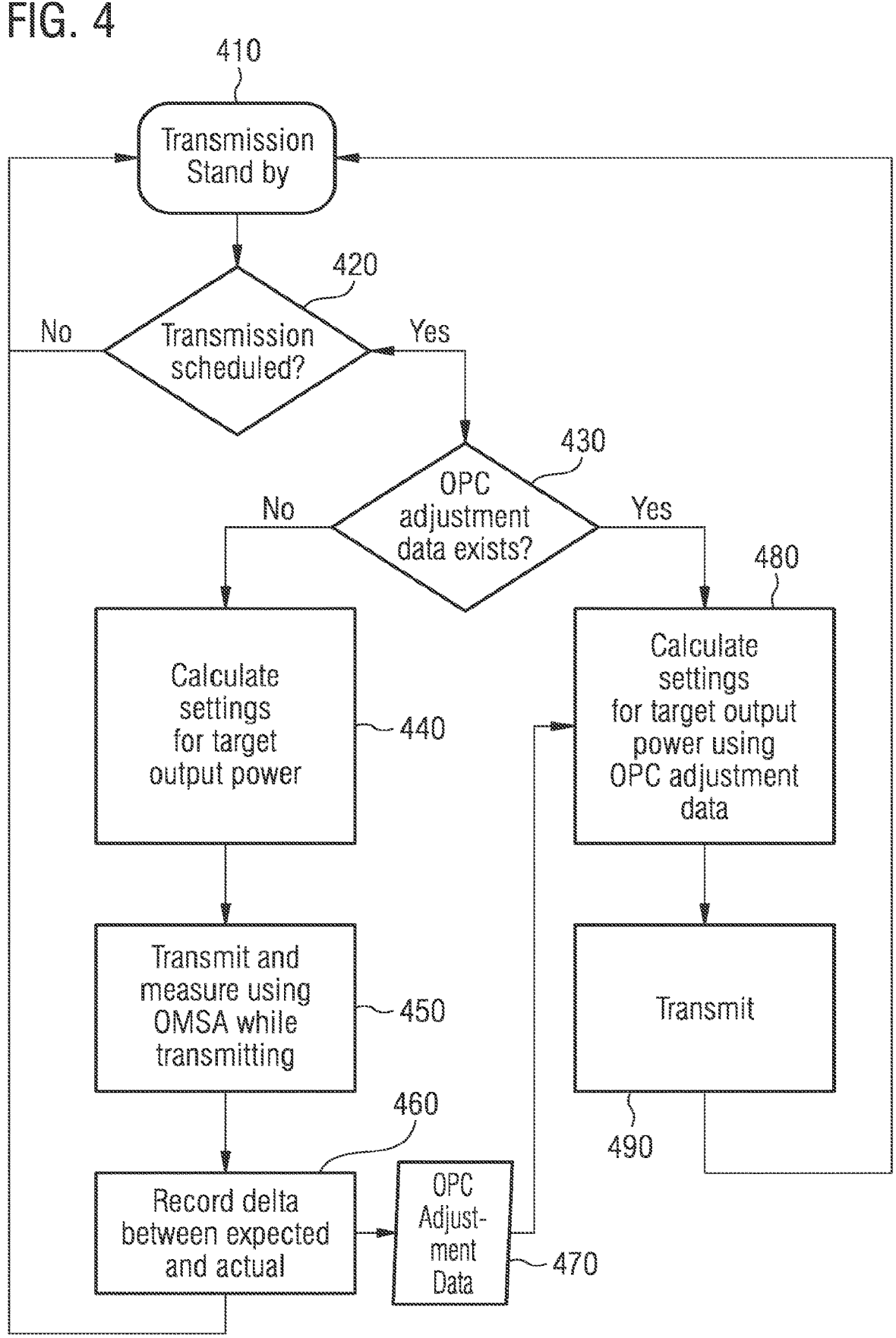
FIG. 4 illustrates a flow chart of a third example of process steps for deriving at least one calibration parameter for a transmitter of a cable modem transceiver.

FIG. 4 illustrates a flow chart of a third example of process steps 410-490 for deriving at least one calibration parameter for a transmitter 120 of a cable modem transceiver 100. The cable modem transceiver 100 may be connected to a cable modem communication system. Further, the cable modem communication system may comprise a cable modem termination system.

The cable modem transceiver 100 is in transmission standby in process step 410. In process step 420 the processor 110 checks, if a transmission is scheduled. In case no transmission is scheduled, process step 410 is repeated. Otherwise, the processor 100 checks, if OPC or OP-SC adjustment data exist in process step 430. In case no OPC or OP-SC adjustment data exist, settings for target output power are calculated by the processor 110 in process step 440. In the following process step 450 a transmit and measure using CMSA while transmitting is performed. A delta between expected and actual, e.g. a delta between an expected property of a calibration signal and an actual property of the calibration signal, is recorded in process step 460. The delta may be added to OPC or OP-SC adjustment data. In case OPC or OP-SC adjustment data exist, settings for target output power using OPC or OP-SC adjustment data are calculated in process step 480. The transmission or a transmit is performed in process step 490.

FIG. 4 shows an example of OP-SC without traffic generation and describes an example of an OP-SC process without data generation by the cable modem transceiver 100. During field operation the cable modem transceiver 100 may transmit using power levels that were commanded by the cable modem termination system, so transmitting at any arbitrary power level and measuring may be avoided. One suggestion may be to use the actual transmissions of the modem or of the cable modem transceiver 100 that occur during normal operation for self-calibration. Since at this point the CMSA may already be self-calibrated, transmissions of the cable modem transceiver 100 may be measured with high accuracy and the required corrections may be stored in an output power calibration adjustment (OP-CA) table. If calibration adjustment data is not available for the target power level or frequency, the transmit path gain settings may be extrapolated as usual from OP-RC and a measurement may be used to find the delta that will be recorded into the alignment table. Since the transmissions may be according to the commands of the cable modem termination system, the calibration adjustment may be found only for the commanded power levels and frequencies. While this may be sufficient for normal operation, a characterization of the frequency response of the system may be used to interpolate or extrapolate the data to other frequencies and power levels if needed. Alternatively or additionally, the cable modem transceiver 100 may deliberately generate traffic by sending packets to its own IP address, hardware address or media access control (MAC) address. This may have the advantage of being able to re-balance gain settings of the transmitter 120 between analog and digital gain without any impact on real data transfer. In other words, transmitting bursts at the required power using various analog gain settings and compensating using the accurate digital gain may be performed.

More details and aspects are mentioned in connection with the embodiments described above or below. The embodiment shown in FIG. 4 may comprise one or more optional additional features corresponding to one or more aspects mentioned in connection with the pro-posed concept or one or more embodiments described above (e.g. FIG. 1-3B) or below (e.g. FIG. 5-10).

Figure 5:
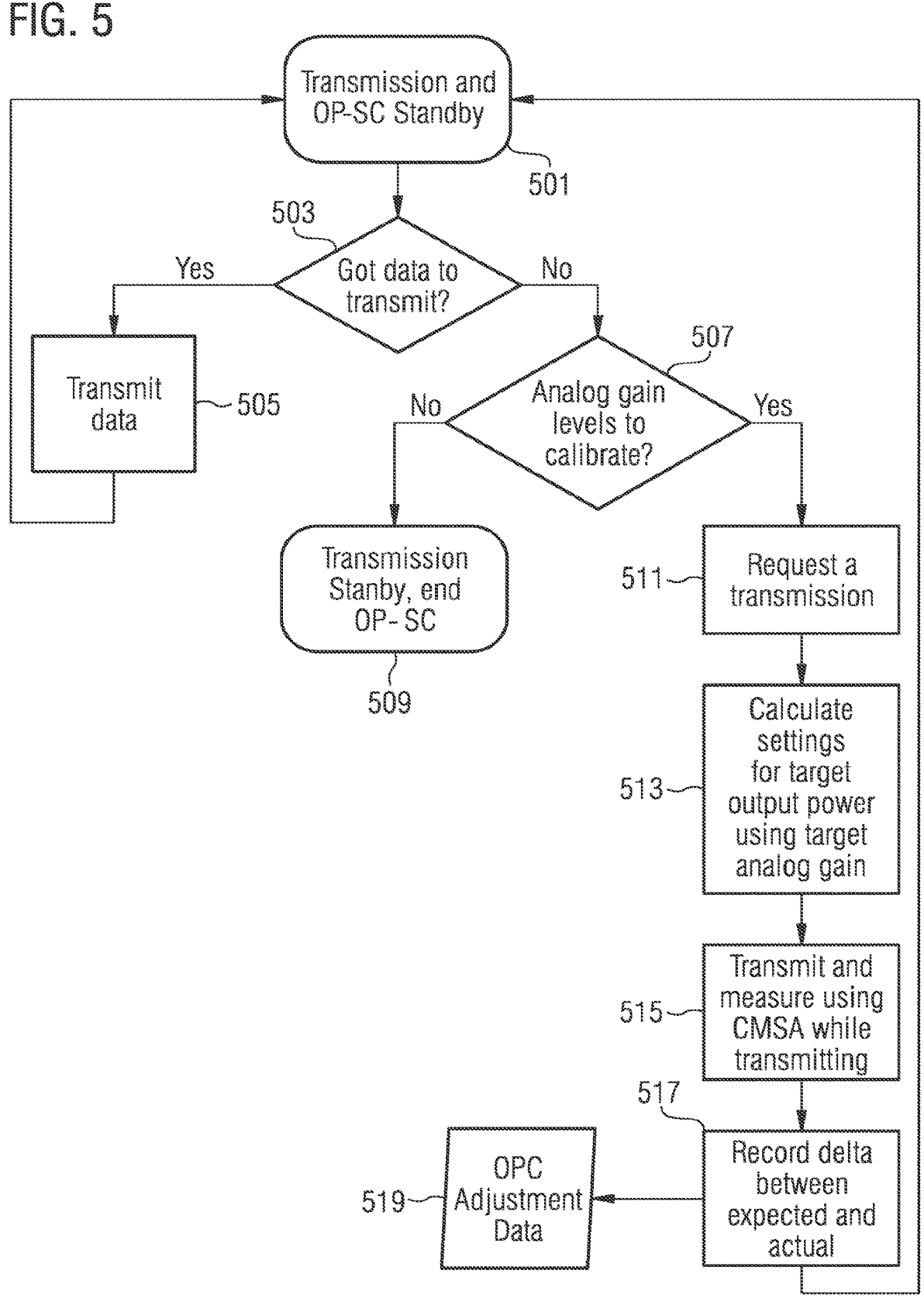
FIG. 5 illustrates a flow chart of a fourth example of process steps for deriving at least one calibration parameter for a transmitter of a cable modem transceiver.

FIG. 5 illustrates a flow chart of a fourth example of process steps 501-519 for deriving at least one calibration parameter for a transmitter 120 of a cable modem transceiver 100. The cable modem transceiver 100 may be connected to a cable modem communication system. Further, the cable modem communication system may comprise a cable modem termination system.

The cable modem transceiver 100 is in transmission and OP-SC standby in process step 501. In process step 503, the processor 110 checks if it got data to transmit. In case the processor 110 got data to transmit, the cable modem transceiver 100 or the transmitter 120 transmits the data in process step 505 and returns to process step 501 afterwards. Otherwise, the processor 110 checks, if there are analog gain levels to calibrate in process step 507. In case there are no analog gain levels to calibrate, the cable modem transceiver 100 enters transmission standby and/or ends OP-SC in process step 509. Otherwise, the cable modem transceiver 100 requests a transmission in process step 511. Afterwards, the processor 110 calculates settings for target output power using target analog gain in process step 513. The cable modem transceiver 100 transmits and measures using CMSA while in transmitting in process step 515. The delta between expected and actual is recorded in process step 517. Then, the recorded delta is added to OPC or OP-SC adjustment data in process step 519 and the cable modem transceiver 100 returns to process step 501.

FIG. 5 shows an example of OP-SC with traffic generation and describes an example of an OP-SC process while using data generation by the cable modem transceiver 100.

According to some examples, the process described above of field OP-SC optionally hap-pens one time only for each pair of frequency and analog gain setting. The process may be repeated when the data for the used frequency and analog gain is not available.

According to some examples, the IMOP may be used for OP-SC as well, in a way similar to the way it is used with CMSA-SC. The cable modem transceiver 100 may transmit at low power levels, e.g. compensating for analog gain change using digital gain, and frequencies, e.g. within the known upstream channel set, measure using CMSA and store in the table. Hereby, the IMOP may be occupied for a longer time, meaning that if another cable modem transceiver tries to register it may take it longer due to collisions with the self-calibrating transmissions of the cable modem transceiver 100.

According to some examples, the CMSA may be used to measure a narrow frequency band, because it will normally take less time and may be easier to fit within the IMOP time frame.

More details and aspects are mentioned in connection with the embodiments described above or below. The embodiment shown in FIG. 5 may comprise one or more optional additional features corresponding to one or more aspects mentioned in connection with the pro-posed concept or one or more embodiments described above (e.g. FIG. 1-4) or below (e.g. FIG. 6-10).

Figure 6:
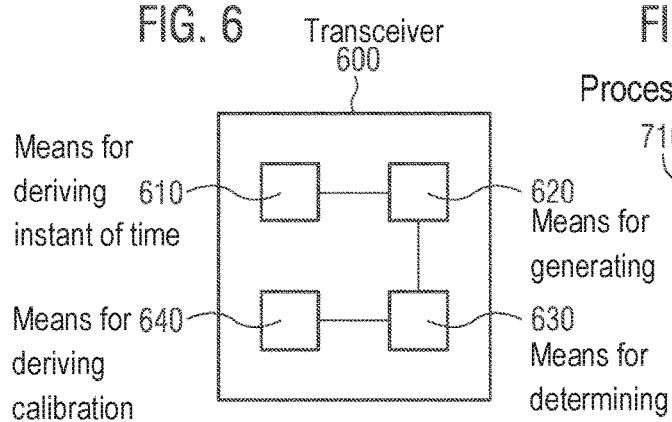
FIG. 6 schematically illustrates a second example of a cable modem transceiver.

FIG. 6 schematically illustrates a second example of a cable modem transceiver 600. The cable modem transceiver 600 comprises means 610 for deriving an instant of time for an upstream calibration signal on basis of upstream scheduling information. Additionally, the cable modem transceiver 600 comprises means 620 for generating the upstream calibration signal at the derived instant of time. The cable modem transceiver 600 further comprises means 630 for determining a property of the generated upstream calibration signal. Additionally, the cable modem transceiver 600 comprises means 640 for deriving at least one calibration parameter for transmitter means of the cable modem transceiver 600 on basis of the detected property.

According to some examples, the cable modem transceiver 600 optionally further comprises means for receiving the upstream scheduling information from a cable modem termination system of a cable modem communication system.

More details and aspects are mentioned in connection with the embodiments described above or below. The embodiment shown in FIG. 6 may comprise one or more optional additional features corresponding to one or more aspects mentioned in connection with the pro-posed concept or one or more embodiments described above (e.g. FIG. 1-5) or below (e.g. FIG. 7-10).

Figure 7:
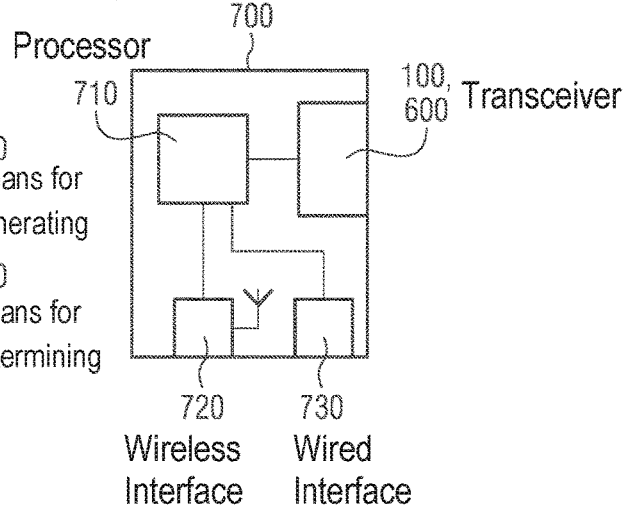
FIG. 7 schematically illustrates an example of a cable modem.

FIG. 7 schematically illustrates an example of a cable modem 700. The cable modem 700 comprises a cable modem transceiver 100, 600. For example, the cable modem is a cable router. Additionally, the cable modem 700 comprises a processor 710, a wireless communication interface 720 and a wired communication interface 730. For example, the wireless communication interface 720 is a Wireless Local Area Network (W-LAN) interface and the wired communication interface 730 is an Ethernet interface. The processor 710 may be con-figured to route data, e.g. internet protocol data, between the cable modem transceiver 100, 600, the wireless communication interface 720 and/or the wired communication interface 730.

More details and aspects are mentioned in connection with the embodiments described above or below. The embodiment shown in FIG. 7 may comprise one or more optional additional features corresponding to one or more aspects mentioned in connection with the pro-posed concept or one or more embodiments described above (e.g. FIG. 1-6) or below (e.g. FIG. 8-10).

Figure 8:
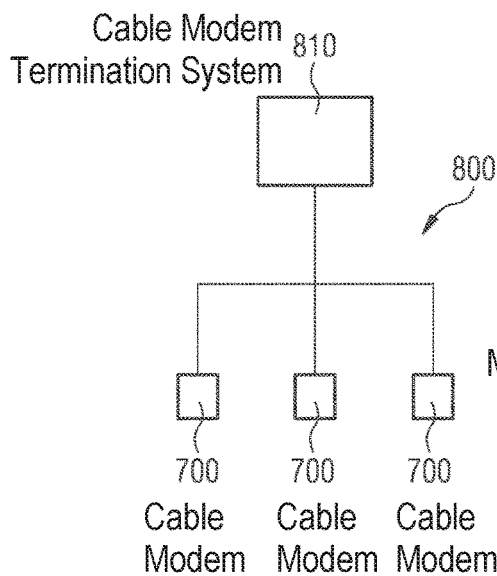
FIG. 8 schematically illustrates an example of a cable modem communication system.

FIG. 8 schematically illustrates an example of a cable modem communication system 800. The cable modem communication system 800 comprises a cable modem termination system 800 and at least one cable modem 700. The at least one cable modem 700 is configured for communicating with the cable modem termination system 810.

More details and aspects are mentioned in connection with the embodiments described above or below. The embodiment shown in FIG. 8 may comprise one or more optional additional features corresponding to one or more aspects mentioned in connection with the pro-posed concept or one or more embodiments described above (e.g. FIG. 1-7) or below (e.g. FIG. 9-10).

Figure 9:
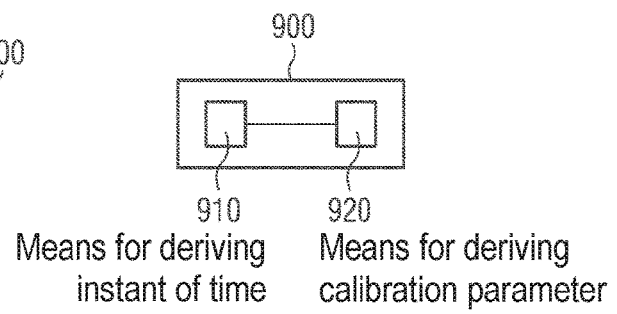
FIG. 9 schematically illustrates an example of a processor for a cable modem transceiver.

FIG. 9 schematically illustrates an example of a processor 900 for a cable modem transceiver 100, 600. The processor 900 comprises means 910 for deriving an instant of time for an upstream calibration signal on basis of upstream scheduling information. Additionally, the processor 900 comprises means 920 for deriving at least one calibration parameter for a transmitter 120 of the cable modem transceiver 100, 600 on basis of a detected property of the calibration signal. For example, the processor 900 may form the processor of the cable modem transceiver described in connection with FIG. 1.

According to some examples, the processor 900 optionally further comprises means for determining a gain parameter for generating the upstream calibration signal by the transmitter 120 and a frequency of the upstream calibration signal on basis of predetermined output power calibration information.

More details and aspects are mentioned in connection with the embodiments described above or below. The embodiment shown in FIG. 9 may comprise one or more optional additional features corresponding to one or more aspects mentioned in connection with the pro-posed concept or one or more embodiments described above (e.g. FIG. 1-9) or below (e.g. FIG. 10).

FIG. 10 illustrates a flowchart of an example of a method 1000 for calibrating a cable modem transceiver 100, 600. The method 1000 comprises deriving 1010 an instant of time for an upstream calibration signal on basis of upstream scheduling information. Additionally, the method 1000 comprises generating 1020 the upstream calibration signal at the derived instant of time. The method 1000 further comprises determining 1030 a property of the generated upstream calibration signal by a detector 130 of the cable modem transceiver 100, 600. Additionally, the method comprises deriving 1040 at least one calibration parameter for a transmitter 120 of the cable modem transceiver 100, 600 on basis of the detected property.

The method 1000 may be performed using the cable modem transceiver described in connection with FIG. 1, the cable modem transceiver described in connection with FIG. 6, the cable modem described in connection with FIG. 7, the cable modem communication system described in connection with FIG. 8, and/or the processor for a cable modem transceiver described in connection with FIG. 9.

For example, deriving 1010 the instant of time and/or deriving 1040 the at least one calibration parameter may be performed by a processor 110 of the cable modem transceiver 100, 600. Generating 1020 the upstream calibration signal may be performed by a transmitter 120 of the cable modem transceiver 100, 600.

According to some examples, the method 1000 optionally further comprises receiving the upstream scheduling information from a cable modem termination system 810 of a cable modem communication system 800.

According to some examples, the method 1000 optionally further comprises detecting signals of other cable modem transceivers within a particular time slot by the cable modem transceiver 100, 600. The upstream calibration signal is generated only, when signals received from other cable modem transceivers are detected by the cable modem transceiver 100, 600 within a series of subsequent particular time slots with a magnitude below a threshold.

According to some examples, the derived instant of time optionally lies prior to a registration of the cable modem transceiver at a cable modem termination system of a cable modem communication system.

For example, a computer program includes program code, when executed, to cause a programmable processor to perform the method 1000.

For example, a non-transitory machine-readable storage medium includes program code, when executed, to cause a programmable processor to perform the method 1000.

More details and aspects are mentioned in connection with the embodiments described above or below. The embodiment shown in FIG. 10 may comprise one or more optional additional features corresponding to one or more aspects mentioned in connection with the proposed concept or one or more embodiments described above (e.g. FIG. 1-9) or below.

Some embodiments relate to a method to improve accuracy of the transmit power and/or an upstream band spectrum measurement of a cable modem.

According to an aspect, an alternative to the suggested self-calibration of the Spectrum Analysis may be to perform a factory calibration, for which resources, e.g. a station, time to calibrate each unit etc., may be used.

According to an aspect, alternatively or additionally to the output power self-calibration may either a full comprehensive factory calibration that may be very resource consuming may be performed or reference output power calibration with characterizations and approximations of various parameters may be used instead of or additionally to the accuracy adjustment table. While the accuracy of DOCSIS 3.1, e.g. +/−2 dB, may be achieved without additional accuracy improvement schemes, power may be saved by reducing gain when the output power level may be lower than the commanded power level when accurate calibration data is available.

According to an aspect, improved upstream power accuracy may be achieved in the cable modem transceiver or in a cable modem. This may be a valuable parameter for non-DOCSIS related operations of the operators such as statistics gathering about the networks.

Example 1 is a cable modem transceiver, comprising a processor configured to derive an instant of time for an upstream calibration signal on basis of upstream scheduling information; a transmitter configured to generate the upstream calibration signal at the derived instant of time; and a detector configured to determine a property of the generated upstream calibration signal; wherein the processor is further configured to derive at least one calibration parameter for the transmitter on basis of the detected property.

In example 2, in the cable modem transceiver according to example 1, the upstream scheduling information indicates a starting point of a non-busy time slot of an upstream path of a cable modem communication system.

In example 3, in the cable modem transceiver according to example 2, the derived instant of time lies within the non-busy time slot of the upstream path of the cable modem communication system. In example 4, in the cable modem transceiver according to example 2 or 3, the non-busy time slot is selected from the group of an initial maintenance opportunity, a broadcast initial maintenance opportunity, a ranging opportunity, and a transmission opportunity.

In example 5, in the cable modem transceiver according to one of the previous examples, the derived at least one calibration parameter for the transmitter comprises a gain parameter for the transmitter.

In example 6, the cable modem transceiver according to one of the previous examples, further comprises an amplifier within the transmitter, wherein the derived at least one calibration parameter comprises a gain value of the amplifier for amplifying upstream signals having a frequency of the generated upstream calibration signal.

In example 7, in the cable modem transceiver according to one of the previous examples, the derived at least one calibration parameter comprises a digital gain value for a digital transmission path of the transmitter.

In example 8, the cable modem transceiver according to one of the previous examples further comprises a receiver configured to receive the upstream scheduling information from a cable modem termination system of a cable modem communication system.

In example 9, in the cable modem transceiver according to example 8, wherein the receiver is further configured to detect signals of other cable modem transceivers within a particular time slot, and wherein the upstream calibration signal is generated only, when signals received from other cable modem transceivers are detected by the receiver within a series of subsequent particular time slots with a magnitude below a threshold.

In example 10 in the cable modem transceiver according to one of the previous examples, the detector is connected to an upstream monitoring path of the cable modem transceiver, and wherein the upstream monitoring path is coupled to a transmission path of the cable modem transceiver after an amplifier of the transmitter.

In example 11, in the cable modem transceiver according to one of the previous examples, the determined property of the generated upstream calibration signal is a magnitude of the generated upstream calibration signal.

In example 12, in the cable modem transceiver according to one of the previous examples, the detector is selected from the group of a spectrum analyzer and a power meter.

In example 13, in the cable modem transceiver according to one of the previous examples, the processor is further configured to determine a gain parameter for generating the upstream calibration signal by the transmitter and a frequency of the upstream calibration signal on basis of predetermined output power calibration information.

In example 14, in the cable modem transceiver according to example 13, the processor is configured to derive the at least one calibration parameter for the transmitter on basis of the determined property, the determined gain parameter for generating the upstream calibration signal, and the predetermined output power calibration information.

In example 15, in the cable modem transceiver according to example 14, the predetermined output power calibration information comprises a predetermined property of a further upstream calibration signal generated by the transmitter, and wherein the derived at least one calibration parameter indicates a difference between the predetermined property and the determined property for the determined gain parameter.

In example 16, in the cable modem transceiver according to example 14, the predetermined output power calibration information comprises a predetermined property of a further upstream calibration signal generated by the transmitter, and wherein the at least one calibration parameter is extrapolated on basis of the predetermined property and the determined property.

In example 17, in the cable modem transceiver according to one of the previous examples, the transmitter is configured to generate a plurality of upstream calibration signals at the derived instant of time, wherein the detector is configured to determine a property of each of the upstream calibration signals of the generated plurality of upstream calibration signals, and wherein the processor is configured to derive the at least one calibration parameter for the transmitter on basis of the determined properties.

In example 18, in the cable modem transceiver according to example 17, the upstream calibration signals of the generated plurality of upstream calibration signals have different frequencies.

In example 19, in the cable modem transceiver according to example 17 or 18, the upstream calibration signals of the generated plurality of upstream calibration signals are generated with different gain parameters for the transmitter.

In example 20, in the cable modem transceiver according to one of the previous examples, the derived instant of time lies prior to a registration of the cable modem transceiver at a cable modem termination system of a cable modem communication system.

Example 21 is a cable modem transceiver, comprising means for deriving an instant of time for an upstream calibration signal on basis of upstream scheduling information; means for generating the upstream calibration signal at the derived instant of time; means for determining a property of the generated upstream calibration signal; and means for deriving at least one calibration parameter for transmitter means of the cable modem transceiver on basis of the detected property.

In example 2, in the cable modem transceiver according to example 21, further comprising: means for receiving the upstream scheduling information from a cable modem termination system of a cable modem communication system.

Example 23 is a cable modem comprising a cable modem transceiver according to one of the previous examples.

Example 24 is a cable modem communication system, comprising a cable modem termination system; and at least one cable modem according to example 23, wherein the at least one cable modem is configured for communicating with the cable modem termination system.

Example 25 is a processor for a cable modem transceiver, comprising means for deriving an instant of time for an upstream calibration signal on basis of upstream scheduling information; and means for deriving at least one calibration parameter for a transmitter of the cable modem transceiver on basis of a detected property of the calibration signal.

In example 26, the processor according to example 25 further comprises means for determining a gain parameter for generating the upstream calibration signal by the transmitter and a frequency of the upstream calibration signal on basis of predetermined output power calibration information. Example 27 is a method for calibrating a cable modem transceiver, comprising deriving an instant of time for an upstream calibration signal on basis of upstream scheduling information; generating the upstream calibration signal at the derived instant of time; determining a property of the generated upstream calibration signal by a detector of the cable modem transceiver; and deriving at least one calibration parameter for a transmitter of the cable modem transceiver on basis of the detected property.

In example 28, the method according to example 27 further comprises receiving the upstream scheduling information from a cable modem termination system of a cable modem communication system.

In example 29, the method according to example 27 or 28 further comprises detecting signals of other cable modem transceivers within a particular time slot by the cable modem transceiver, wherein the upstream calibration signal is generated only, when signals received from other cable modem transceivers are detected by the cable modem transceiver within a series of subsequent particular time slots with a magnitude below a threshold.

In example 30, in the method according to one of examples 27 to 29, the derived instant of time lies prior to a registration of the cable modem transceiver at a cable modem termination system of a cable modem communication system.

Example 31 is a computer program including program code, when executed, to cause a programmable processor to perform the method of example 27 or 30.

Example 32 is a non-transitory machine readable storage medium including program code, when executed, to cause a programmable processor to perform the method of example 27 or 30.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof. A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A modem, comprising:
a processor configured to identify a reference point for an upstream calibration signal in view of upstream scheduling information;
a transmitter configured to generate the upstream calibration signal at the reference point; and
a detector configured to:
determine a calibration property in view of the upstream calibration signal, wherein the processor is further configured to identify at least one calibration parameter for the transmitter in view of the calibration property; and
detect signals of other cable modem transceivers within a particular time slot, the upstream calibration signal being generated when signals received from the other cable modem transceivers are detected to be within a series of subsequent particular time slots with a magnitude below a threshold.

2. The modem of claim 1, wherein the calibration property includes a property of a downstream calibration signal.

3. The modem of claim 2, wherein the downstream calibration signal is related to a cable modem termination system (CMTS).

4. The modem of claim 3, wherein the reference point is received from the CMTS.

5. The modem of claim 1, wherein the reference point includes a timestamp.

6. The modem of claim 1, where identifying the reference point for the upstream calibration signal includes deriving the reference point.

7. The modem of claim 1, wherein the reference point is derived at a customer premises.

8. The modem of claim 1, wherein the calibration parameter is determined in response to the modem being connected to a cable modem communication system (CMCS) at a customer premises.

9. The modem of claim 1, wherein the calibration property includes a difference between an actual value of the upstream calibration signal and an expected value.

10. The modem of claim 9, wherein the at least one calibration parameter is identified in view of the difference between the actual value of the upstream calibration signal and the expected value.

11. The modem of claim 1, wherein the calibration property is determined in view of an offset in relation to the reference point.

12. The modem of claim 11, wherein the offset is updated in view of a change in ranging.

13. The modem of claim 1, wherein the reference point is determined in view of a ranging opportunity.

14. The modem of claim 1, wherein the at least one calibration parameter for the transmitter comprises a gain parameter for the transmitter.

15. The modem of claim 1, wherein the calibration property of the upstream calibration signal includes a magnitude of the generated upstream calibration signal.

16. The modem of claim 1, wherein the at least one calibration parameter includes a calibration adjustment.

17. The modem of claim 16, wherein the at least one calibration parameter is stored in calibration adjustment table.

18. The modem of claim 16, wherein the adjustment includes a timing adjustment.

19. The modem of claim 1, wherein the at least one calibration parameter is derived in view of a self-calibration of the modem.

20. The modem of claim 1, the modem being configured to calibrate a plurality of frequencies.

21. The modem of claim 1, the upstream scheduling information to indicate a starting point of a non-busy time slot of an upstream path of a cable modem communication system.

22. The modem of claim 1, the detector further configured to detect signals of the other cable modem transceivers within the particular time slot, the upstream calibration signal being generated when no signals from the other cable modem transceivers are detected within the series of subsequent particular time slots.

* * * * *